(12) United States Patent
Wuestman

(10) Patent No.: US 6,840,396 B2
(45) Date of Patent: Jan. 11, 2005

(54) CONTAINER ASSEMBLY FOR MAINTAINING CONTAINER CONTENTS IN A DESIRED AMBIENT TEMPERATURE

(76) Inventor: Penny M. Wuestman, 622 Hillcrest Ct., West Dundee, IL (US) 60118

( * ) Notice: Subject to any disclaimer, the term of this patent is extended or adjusted under 35 U.S.C. 154(b) by 229 days.

(21) Appl. No.: 10/201,477

(22) Filed: Jul. 23, 2002

(65) Prior Publication Data

US 2004/0016760 A1 Jan. 29, 2004

(51) Int. Cl.$^7$ .............................................. B65D 21/032
(52) U.S. Cl. ............................... 220/592.28; 220/573.4; 220/574.2
(58) Field of Search .......................... 220/592.28, 573.1, 220/573.4, 575, 574.2, 574.3, 560.03, 592.15, 592.22, 592.23, 4.27, 23.83, 23.86, 23.87, 23.91, 501, 503, 521, 912; 206/514

(56) References Cited

U.S. PATENT DOCUMENTS

| | | | |
|---|---|---|---|
| 2,507,425 A | 5/1950 | Swartout | |
| 3,130,288 A | 4/1964 | Monaco et al. | |
| 3,241,706 A | 3/1966 | Monaco et al. | |
| 3,670,916 A | 6/1972 | Alpert | |
| 4,005,585 A | 2/1977 | Lyons | |
| 4,147,277 A | * 4/1979 | Bateman et al. | ......... 220/574.2 |
| 4,544,022 A | 10/1985 | Tomac | |
| 4,688,398 A | 8/1987 | Baek | |
| 5,231,850 A | 8/1993 | Morris | |
| 5,372,274 A | 12/1994 | Freedland | |
| 5,611,206 A | 3/1997 | Sargent | |
| 5,701,757 A | 12/1997 | Heverly | |
| 5,727,857 A | 3/1998 | Smith | |
| 6,244,065 B1 | 6/2001 | Wuestman | |

* cited by examiner

Primary Examiner—Stephen Castellano
(74) Attorney, Agent, or Firm—Meroni & Meroni, P.C.; Christopher J. Scott; Charles F. Meroni, Jr.

(57) ABSTRACT

The present invention provides a container assembly and method for maintaining container contents in a desired ambient temperature. The device comprises an outer bowl member, an inner vessel member and a lid member, all of which are constructed with porous materials. Critically-select portions of the outer bowl member, the inner vessel member and the lid member are glazed with a vapor-impervious coating while the remaining portions of the container assembly are left unglazed. The glazed portions thus provide an avenue for vapor or liquid media, emanating from temperature-maintaining matter, to permeate through the interstitial pores of the material by entering and exiting through the unglazed portions of the container assemblage. Container contents, housed in the lidded inner vessel member, are thus more efficiently maintained in a desired ambient temperature.

12 Claims, 6 Drawing Sheets

CONTAINER ASSEMBLY FOR MAINTAINING CONTAINER CONTENTS IN A DESIRED AMBIENT TEMPERATURE

BACKGROUND OF THE INVENTION

1. Field of the Invention

The present invention relates to a container assembly for refrigerating, heating, and storing substances for subsequent usage and a method of refrigerating, heating, and storing using the concepts of the present invention. More specifically, the present invention is primarily intended as a container assembly for storing a substance in a temperature controlled environment whereby the target substance is contained within a first container and the first container is nestedly received in a second container. The second container houses a temperature-maintaining substance for maintaining the internal temperature of the first container.

2. Description of the Prior Art

The process of lowering a temperature and maintaining it in a given space for the purpose of chilling foods or preserving certain substances is commonly known as refrigeration. By placing a given temperature-controlled substance into a lowered temperature environment and maintaining the same in a desired ambient temperature, the resultant refrigeration checks both bacterial growth and adverse chemical reactions that would otherwise occur in normal atmosphere. The use of natural or manufactured ice for refrigeration purposes was widespread the world over until the early 1900's when mechanical or electric refrigerators became available, but is still commonly used to maintain temperature-controlled substances in a chilled ambient temperature. Ice or frozen water owes its effectiveness as a cooling agent to the fact that it has a constant fusion temperature of 0 Celcius (32 Fahrenheit). Other temperature-maintaining substances such as solid carbon dioxide (dry ice) have also proven to be effective refrigerants. Dry ice, for example, has no liquid phase at normal atmospheric temperature and sublimes directly from a solid state to a vapor phase at a temperature of −78.5 Celcius (−109.3 Fahrenheit). It is during this period of sublimation that solid carbon dioxide is effective for maintaining temperature-controlled products in low ambient temperatures.

The vapor of a substance refers to the gaseous state of a given substance. If confined at any temperature, the vapor emitted from any substance exerts pressure known as vapor pressure, and as the temperature of the substance is raised, the vapor pressure increases as a result of increased evaporation. When the local vapor pressure above a liquid becomes equal to the total pressure because of heat, boiling will occur. For most solids at ordinary temperatures and pressures, the vapor pressure is small or negligible. A finite vapor pressure exists, however, as the presence of water vapor over ice demonstrates.

Modern developments in refrigeration, heating, and storage techniques have provided various devices for maintaining temperature-controlled substances in a chilled or heated state so as to prepare the temperature-controlled substance for subsequent use. In this last regard, edible matter or food is often the target temperature-controlled substance and it is with this backdrop that the present invention is presented. The present invention harnesses the properties inherent in given temperature-maintaining matter, particularly the vapor pressure, for chilling or heating temperature-controlled substances for subsequent usage. Preferably, the present invention is intended as a serving vessel for mealtime.

In this last regard, it is noted that meals comprise not only the act or the time of eating a portion of food to satisfy an appetite, but often further comprise a social engagement in which situation those dining take pleasure in the visual experience of the meal as well as the edible quality of the meal. As is well known in the culinary arts, the visual presentation of a meal is a paramount consideration to the overall dining experience. Thus, in its basic form and function, the present invention incorporates specific materials and structure to form an aesthetically pleasing appearance, which results in a novel container assembly for storing substances in a preferred ambient temperature.

Among food items requiring refrigeration, heating, and storage are butter, margarine, and other similar spreads. The preservation of butter and the like present unique problems, not applicable to other condiments, such as ketchup, salt, sugar and so forth. For example, when using butter or similar other spreads in cooking, the butter and spreads are often required to be melted or soften prior to their addition to the recipe. However, when served directly at the meal, butter or similar other spreads are usually required to be chilled and maintained in a solid state. In an effort to provide for these requirements, many devices have been developed in an effort to provide an apparatus for maintaining temperature-controlled substances in a refrigerated or heated ambient temperature, some of which are described hereinafter.

U.S. Pat. No. 2,507,425 ('425 Patent), which issued to Swartout, discloses a Double Bowl and Cover. The Double Bowl and Cover discloses a two-bowl and cover assemblage, in which a first bowl is nestedly received in a second bowl. Support tab members on the second bowl hold receive and support similarly placed suspension tab members on the first bowl such that when nested, a relatively uniform space is provided between the outer surface of the inner bowl and the inner space of the second bowl. It is contemplated that a water jacket fills the relatively uniform space for maintaining the target temperature-controlled substance in a desired ambient temperature. It will thus be seen, however, that the '425 Patent does not teach the use of porous material in the construction of the double bowl assemblage nor does the '425 Patent teach the application of vapor-impervious glazed coating on critically-select portions of the porous material for allowing vapor from the water jacket to permeate through the porous material in a controlled manner for improving the temperature-maintaining characteristics of the Double Bowl and Cover.

U.S. Pat. Nos. 3,130,288 ('288 Patent) and 3,241,706 ('706 Patent), which issued to Monaco et al., disclose Food-Service Devices. The Food Service-Devices each disclose the use of a deep pan for retaining temperature-maintaining matter such as heated or chilled water bath and at least one smaller tray-shaped container for supporting food items above the water bath. The tray-shaped container may be nestedly placed into the deep pan, which smaller tray-shaped containers are enclosed by a translucent, preferably dome-shaped cover or lid, for the visual benefit of passersby. The temperature-maintaining substance thus contributes to the maintenance of a desired temperature in the enclosed tray-shaped containers. Neither the '288 Patent nor the '706 Patent teach the use of porous material in the construction of the deep pan, smaller tray-shaped containers, or translucent dome-shaped lid. Furthermore, neither the '288 Patent nor the '706 Patent teach the application of vapor-impervious glazed coating on critically-select portions of the deep pan, smaller tray-shaped container or cover for allowing vapor from the water bath to permeate through porous material in a controlled manner for improving the temperature-maintaining characteristics of the Food-Service Devices.

U.S. Pat. No. 3,670,916 ('916 Patent), which issued to Alpert, discloses a Food Containerization assembly. This invention teaches an insulated food container having an outer vessel formed in part of heat-resistant materials, which outer vessel comprises an upper peripheral ledge. An inner vessel, adapted to hold food, has a peripheral flange, which flange rests on the peripheral ledge and thus disposes the inner vessel in gapped relation to the outer vessel member. The gapped relation structurally results in an insulative layer of air between the inner and outer vessel members. The container is closed by a lid having suitable means to sealably engage the rim portion of the outer vessel member and has a conically-shaped portion, the vertex of which is fracturable under high internal pressure to provide relief of the vapor pressure that may accumulate within the sealed container. It will thus be seen that the '916 Patent does not teach the use of porous material in the construction of the outer vessel member, the inner vessel member, or the lid member. It will be further seen that the '916 Patent does not teach the application of vapor-impervious glazed coating on critically-select portions of the outer vessel member, inner vessel member or lid for allowing vapor in the insulative layer of air between the inner and outer vessel members to permeate through porous material in a controlled manner for improving the temperature-maintaining characteristics of the Food Containerization assembly.

U.S. Pat. No. 4,005,586 ('586 Patent), which issued to Lyons, discloses a Refrigerated Butter Dish, known in the marketplace as the BUTTER BELL CROCK™ brand butter dish. The Refrigerated Butter Dish comprises a receptacle for containing crushed ice and an invertable cover unit which has on one side thereof a handle for lifting the cover and on the other an outwardly extending tapered skirt defining interiorly thereof a butter receiving chamber. When the dispenser is not being used, the cover is positioned so that the skirt portion depends inwardly of the receptacle, keeping the butter contained therein in close proximity with the crushed ice. When it is desired to remove the butter from the dispenser, the cover is inverted so that the skirt portion extends upwardly, making the butter chamber readily accessible to the user. The '586 Patent thus discloses that the skirt must be inverted 180 degrees for removing the butter and returned to an upside-down position for storing the butter against the ice. The '586 Patent thus further shows that the Refrigerated Butter Dish is susceptible to mixing of the butter with any melted ice and is impractical for refrigerating melted or softened butter, which may fall out of the skirt when turned upside-down. In this last regard, it is further noted that butter may easily become contaminated by coming into contact with the ice water solution in the receptacle for containing crushed ice, which is a notable disadvantage of the Refrigerated Butter Dish.

Furthermore, the '586 Patent does not teach the use of porous material in the construction of the receptacle for containing crushed ice or the invertable cover member. Further, the '586 Patent does not teach the application of vapor-impervious glazed coating on critically-select portions of the receptacle for containing crushed ice or the invertable cover member for allowing vapor from the space between the crushed ice receptacle and the invertable cover member to permeate through the interstitial pores of the structure in a controlled manner for improving the temperature-maintaining characteristics of the Refrigerated Butter Dish.

Moreover, U.S. Pat. No. 5,372,274 ('274 Patent), which issued to Freedland, discloses a Container for the Storage and Serving of Food Products comprising an outer bowl, and an inner bowl receivable within the outer bowl such that a space is defined between the outer and inner bowls for containing ice or hot packs for cooling or heating the walls of the inner bowl. The device of the '274 Patent further comprises a drain assembly for selectively draining excess salad dressing or water out of the inner bowl. The drain assembly is formed in part from a bottom wall portion of the inner bowl and a drain cover plate that is slidably mounted over the wall portion. Both the bottom wall portion of the inner bowl and the drain cover plate include mutually registrable patterns of drain ports which may be slidably moved into alignment when drainage of the inner bowl is desired. However, the usage of a drain system in the bottom of the inner bowl can allow for melted or softened food products, like butter and spread, to spill or drain unnecessarily or unwantingly from the device of the '274 Patent. Thus, it will be seen that the '274 Patent does not teach the use of porous material in the construction of the outer or inner bowl members. Further, the '274 Patent does not teach the application of vapor-impervious glazed coating on critically-select portions of the outer and inner bowl member for allowing chilled or heated vapors from the space between the outer and inner bowl members to permeate through porous material in a controlled manner for improving the temperature-maintaining characteristics of the Container for the Storage and Serving of Food Products.

It is noted that none of the prior art teaches a container assembly comprising nested elements and a lid member, wherein the nested elements and lid member are constructed from porous materials and which porous material is coated with a vapor-impervious glazed coating glazing. Further, none of the prior art teaches a container assembly which comprises vapor-impervious glazed coating on critically select portions of the nested elements for controlling the path of permeating vapor. In this regard, vapor from temperature-maintaining matter located in the space between nested elements, although present in the prior art systems, has not been shown to be harnessed for improving the maintenance of temperature in the chamber holding temperature-controlled substances. The prior art thus perceives a need for a container assembly comprising porous materials, which when coated with a vapor-impervious glazed coating glazing on critically select portions of the individual components, directs permeating vapor through the interstitial pores of the structure for improving the temperature-maintaining characteristics of the container assembly.

SUMMARY OF THE INVENTION

Accordingly, it is an object of the present invention to provide a container assembly that can refrigerate, heat, and store substances, such as butter and similar other spreads for use in cooking, serving, and the like. Another object of the present invention is to provide a container assembly, which harnesses vapor from temperature-maintaining matter located in an inferior chamber, to improve the temperature-maintaining characteristics of the container assembly. Moreover, the vapor-harnessing container assembly would provide a controlled self-sustaining environment minimizing unnecessary spillage while maximizing refrigeration or heating of the target temperature-controlled substance located in a superior chamber. It is a further object of the present invention to provide a container assembly that can also be portable and separable for conveniently storing temperature-controlled substances and for enabling users to easily gain access to the temperature-controlled substance contained therein. In this last regard, it is a further object of the present invention to provide a container assembly adapted for serving dish use, which is uniquely configured such that, in its structural design, the serving dish assembly further contributes to an aesthetically pleasing serving dish for improving the mealtime experience. Further, it is an object of the present invention to provide a serving dish, which will maintain temperature-controlled substances at a desired temperature in either a covered or uncovered state.

To achieve these and other readily apparent objectives, the present invention provides a container assembly and method for maintaining a temperature-controlled substance in an ambient temperature so as to store the temperature-controlled substance in a ready state for consumption and/or use. In particular, it is contemplated that butter, margarine or other similar spreads may be kept in a ready state for consumption by storing the same in the present invention. In this regard, the present invention generally comprises an outer bowl member, an inner vessel member, and a lid member, which are each preferably constructed with a hydrophilic, porous ceramic material.

The outer bowl member is designed for containing temperature-maintaining matter or preferably an iced or chilled water solution, or other liquid medium having similar volatility characteristics. The present invention preferably utilizes the resultant vapor from the volatile liquid medium to function properly. The outer bowl member comprises an inner bowl surface, an outer bowl surface, a superior bowl support rim, and an inferior bowl contact surface. The inner bowl surface, the outer bowl surface and the superior bowl support rim each further comprise a vapor-impervious glazed coating to prevent the passage of vapor through the vapor-impervious glazed coating so as to directionally utilize vapor emanating from the temperature-maintaining medium.

The inner vessel member is designed for containing a temperature-controlled substance, or in particular, a food substance such as butter or similar other spread. The inner vessel member comprises an inner vessel surface, an outer vessel surface, a superior perimeter flange, a superior vessel contact seat and an inferior vessel portal ridge. The superior perimeter flange is sized and shaped to snug down or rest atop the superior bowl support rim for preventing the passage of vapor between the juncture of the superior perimeter flange and the superior bowl support rim. The superior vessel contact seat is spatially-located inwardly adjacent to the superior perimeter flange and has a predetermined contact seat perimeter. The outer vessel surface is sized and shaped to rest in gapped relation to the inner bowl surface thus creating a container cavity for retaining the vapors from the temperature-maintaining matter. The inner vessel surface, the outer vessel surface and the superior perimeter flange are each further provided with a vapor-impervious glazed coating to prevent passage of vapor through the vapor-impervious glazed coating and facilitate directed movement of the vapor through the porous structure of the inner vessel member.

The lid member functions to optionally enclose the inner vessel member and comprises an inner lid surface, an outer lid surface, a superior lifting protrusion, and an inferior lid contact surface. The inferior lid contact surface has a predetermined lid contact surface perimeter, which is slightly less in dimension than the dimension of the superior contact seat perimeter. The inferior lid contact surface is sized and shaped to snug down or rest atop the superior vessel contact seat for preventing the passage of vapor between the juncture of the inferior contact surface and the superior contact seat.

The inner lid surface, the outer lid surface, and the superior lifting protrusion each further comprise a vapor-impervious glazed coating to prevent the passage of vapor through the vapor-impervious glazed coating. Unglazed portions of the container assembly, namely, the superior vessel contact seat, the inferior vessel portal ridge and the inferior lid contact surface thus allow vapor to permeate throughout the porous ceramic material to facilitate the maintenance of temperature within the enclosed inner vessel member for temperature-controlling the target substance.

The porous ceramic material comprising the inner vessel member thus further allows vapor to permeate through the superior vessel contact seat and into the inferior lid contact surface. The passage of vapor in this manner thus further facilitates the maintenance of temperature in the enclosed inner vessel member. Additionally, the perimeter of the inferior lid contact surface, having a measured dimension less than the measured dimension of the contact seat perimeter, thus exposes a contact seat vent portion of the superior vessel contact seat. The contact seat vent portion allows vapor to permeate from the superior vessel contact seat to the air adjacent the enclosed inner vessel member for further facilitating the maintenance of temperature in the enclosed inner vessel member.

Additionally, other structural features of the present invention are further disclosed. For example, the inner lid surface and the outer lid surface of the lid member may further define an ellipsoidal upper shell, which increases the internal volume of the enclosed inner vessel member. Users of the present invention may thus place a more voluminous temperature-controlled substance therein. Additionally, the superior perimeter flange further comprises at least one outwardly extending handle for facilitating the removal of the inner vessel member from the outer bowl member. In an alternative embodiment, the porous ceramic material used to construct the container assembly components may be further defined by comprising oven-proofed material for use in heated environments. Additionally, in an alternative embodiment, the container assembly components, or the outer bowl member, the inner vessel member and the lid member are each shaped so as to have a substantially circular horizontal cross section. Further, the inferior bowl contact surface may include an inferior bowl perimeter ridge, which ridge elevates the inferior bowl contact surface from a contact surface so as to prevent temperature-related damage to the contact surface.

The present invention further provides a method of maintaining a temperature-controlled substance in a desired ambient temperature, which method comprises a series of steps. In the first instance, an outer bowl member, as summarized above, is provided. Temperature-maintaining matter having certain volatility is then placed into the outer bowl member, from which vapor is allowed to permeate. An inner vessel member, as summarized above, is then provided. Into the inner vessel member is placed a temperature-controlled substance, such as butter or similar other spread. The inner vessel member with its contents is then nested into the outer bowl member so as to create a container cavity for retaining the vapor. A lid member, as summarized above, is then further provided, which lid member encloses the inner vessel member for maintaining the temperature-controlled substance in the desired ambient temperature. Vapor from the temperature-maintaining substance is thus allowed to permeate from the container cavity through the inferior vessel portal ridge between the inner vessel and outer vessel surfaces, through the superior vessel contact seat and into the inferior lid contact surface. The passage of vapor in this manner thus further facilitates the maintenance of temperature in the enclosed inner vessel member. Additionally as noted above, the perimeter of the inferior lid contact surface, having a measured dimension less than the measured dimension of the contact seat perimeter, thus exposes a contact seat vent portion of the superior vessel contact seat. The contact seat vent portion allows vapor to permeate from the superior vessel contact seat to the air adjacent the enclosed inner vessel member for further facilitating the maintenance of temperature in the enclosed inner vessel member.

Other objects of the present invention, as well as particular features, elements, and advantages thereof, will be elucidated in, or apparent from, the following description and the accompanying drawing figures.

BRIEF DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
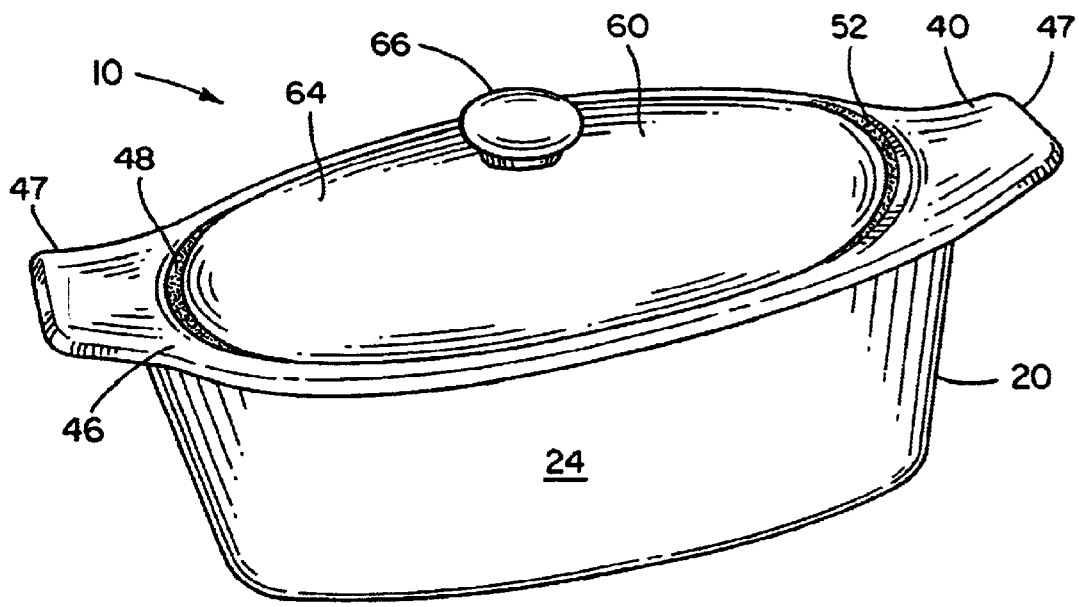
FIG. 1 is a perspective view of the preferred embodiment of the container assembly in an assembled state.

Referring now to the drawings, the preferred embodiment of the present invention concerns a container assembly 10 as perspectively illustrated in FIG. 1 for maintaining a temperature-controlled substance in a preferred ambient temperature so as to store the temperature-controlled substance in a ready state for consumption and/or use. In particular, it is contemplated that butter, margarine or other similar spreads may be kept in a ready state for consumption by storing the same in the present invention as opposed to being forced to store the spread material in a conventional refrigerating appliance, where such appliance storage may be inconvenient for serving purposes. The present invention thus provides a freely transportable container assembly 10, which maintains a preferred temperature in a removably-lidded chamber, designed primarily for serving purposes.

In this last regard, it is noted that meals comprise not only the act or the time of eating a portion of food to satisfy an appetite, but often further comprise a social engagement where those dining take pleasure in the visual experience of the meal as well as the edible quality of the meal. As is well known in the culinary arts, the visual presentation of a meal is of paramount importance to the overall dining experience. Thus, in its basic form and function, the present invention incorporates specific materials and structure to form an aesthetically pleasing container assembly, which results in a novel container assembly for storing substances in a preferred ambient temperature.

While it is contemplated that container assembly 10 may either storably refrigerate or storably heat a target food substance, it is not intended that the present invention be limited solely to a container assembly for use with food items. Rather it is intended that the scope of the present invention may include a container assemblage for refrigerating, heating, and storing substances not ordinarily associated with meals or the dining experience, such as medical products, plant products, pet products, and the like.

As is illustrated in FIGS. 1–9, inclusive, the preferred embodiment of the present invention comprises container assembly 10, which is also commercially known in the kitchenware marketplace as a BUTTER BOAT™ brand spread serving dish. Container assembly 10 generally comprises an outer bowl member 20, an inner vessel member 40, and a lid member 60, which are each fashioned from breathable or porous materials. In this last regard, excellent results have been shown when hydrophilic, open-pore-structured porous ceramic materials are used in the construction of container assembly 10. Open pore structure is here defined as comprising material that permits a fluid or vapor to move from one surface to an opposing surface in the material through a convoluted pathway of interconnecting networked channels. Further description of the preferred materials and movement of fluid or vapor through the interstitial pores is found below under the section entitled: DISCUSSION OF PREFERRED MATERIALS.

Figure 2:
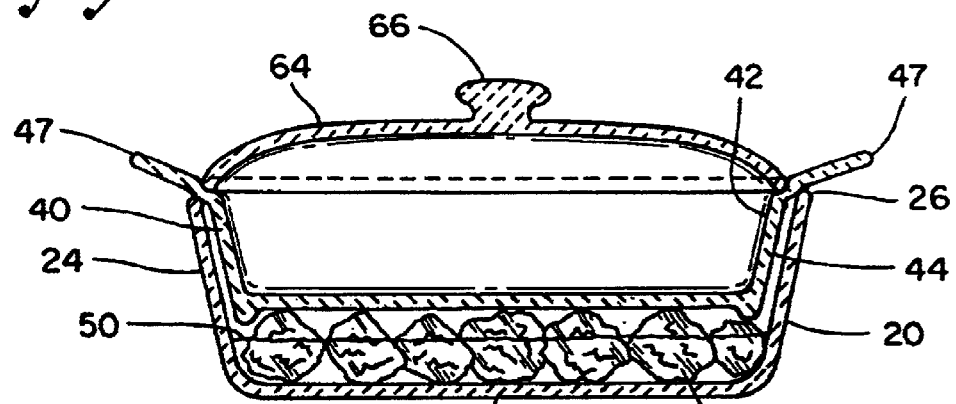
FIG. 2 is a cross-sectional side view of the embodiment of FIG. 1 showing suspended placement of the enclosed inner vessel member within the outer bowl member including a container cavity holding temperature-maintaining matter.
Figure 3:
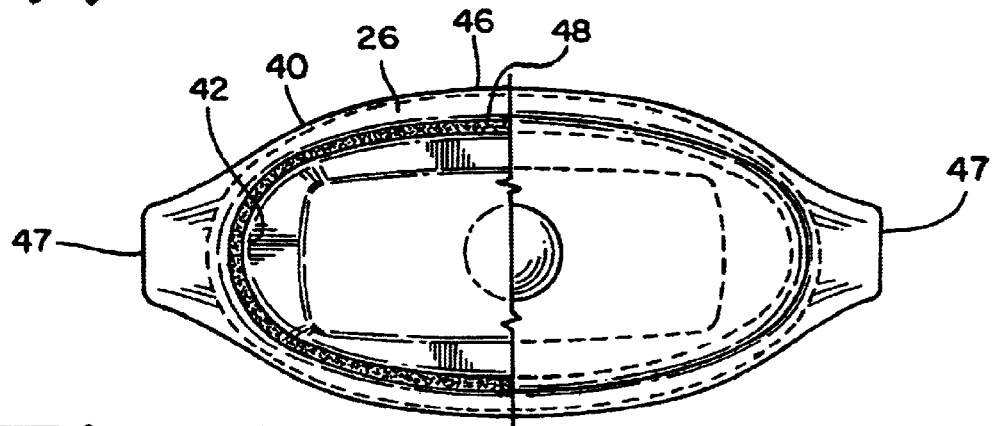
FIG. 3 is a fragmentary top plan view of the preferred embodiment of the container assembly showing the structural interaction of the primary components of the container assembly with the components partially illustrated in phantom.
Figure 8:
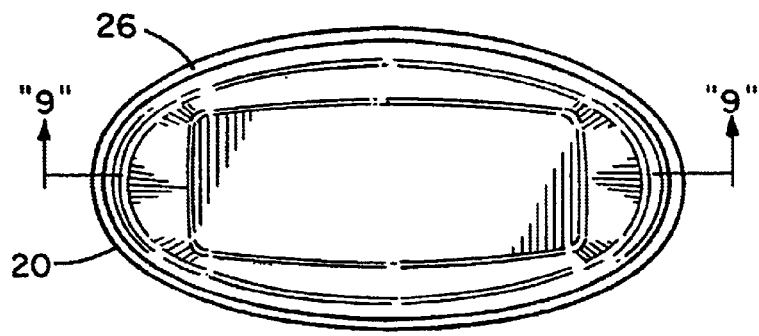
FIG. 8 is a top plan view of the outer bowl member showing superior bowl support rim.

Outer bowl member 20, as is illustrated in FIGS. 1, 2, 8 and 9, is an open-top bowl-shaped container and is preferably fashioned to have an elliptic horizontal cross-section or approximate an elliptic shape when viewed from a top plan view as specifically illustrated in FIG. 8. Outer bowl member 20 functions to retain or contain temperature-maintaining matter. It is intended that the temperature-maintaining matter may be further defined by most often comprising a volatile liquid solution. In this last regard, excellent results have been shown when chilled water-based solutions have been used to maintain a cooler ambient temperature and when heated water-based solutions have been used to maintain a warmer ambient temperature. FIG. 2 illustrates a typical ice-water solution 100 commonly used to refrigerate temperature-controlled substances. As is well known in the thermodynamic arts, water is an excellent retainer of its thermal energy. In other words, water-based solutions tend to lose heat energy relatively slowly, heat energy being defined as the energy, which is transferred from a higher-temperature composition to a lower-temperature composition because of a temperature difference. It is further contemplated, however, that other liquid media having similar volatility characteristics and heat energy retention characteristics compared to water-based solutions may also be utilized. The present invention attempts to harness the inherent off-vaporing or permeation of vapor that occurs when volatile temperature-maintaining matter is utilized. The present invention thus depends upon the resultant off-vapor or permeating vapor to function properly. As in known in the prior art, water as vapor effectively distributes uniformly throughout a porous material and in this regard, it is the preferred temperature-maintaining matter substance of choice.

Figure 9:
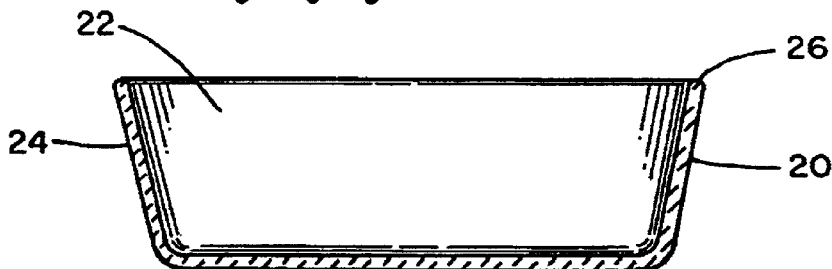
FIG. 9 is a cross-sectional side view of the outer bowl member of FIG. 8.

Outer bowl member 20 comprises an inner bowl surface 22 as illustrated in FIGS. 8 and 9; an outer bowl surface 24 as illustrated in FIGS. 1, 2 and 9; a superior bowl support rim 26 as illustrated in FIGS. 2, 3, 8 and 9; and an inferior bowl contact surface 28 as illustrated in FIGS. 2 and 9. Inner bowl surface 22, outer bowl surface 24 and superior bowl support rim 26 each further preferably comprise a hydrophobic, vapor-impervious, glazed coating, preferably of a type that functions to prevent passage or permeation of vapor or water-based solution through the vapor-impervious glazed coating, thus forcing permeating vapor in an upward direction toward the open-top of the bowl-shaped outer bowl member 20. Preferably, inferior bowl contact surface 28 is left unglazed. Left unglazed, inferior bowl contact surface 28 thus increases frictional forces between inferior bowl contact surface 28 and a contact surface upon which container assembly 10 is placed, thus reducing the tendency for outer bowl member 20 to slide along the contact surface. A line of demarcation may also be added to inner bowl surface 22 for aiding users in the placement of temperature-maintaining matter into outer bowl member 20 without overfilling the same.

Figure 6:
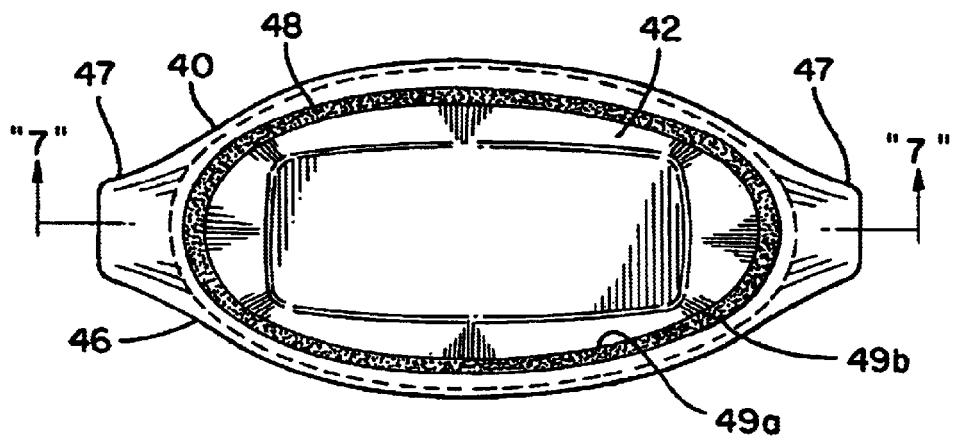
FIG. 6 is a top plan view of the inner vessel member nested inside the outer bowl member showing the superior vessel contact seat.
Figure 7:
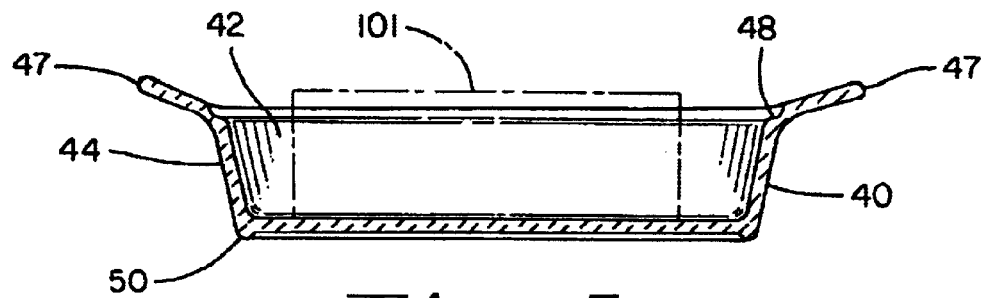
FIG. 7 is a cross-sectional side view of the inner vessel member of FIG. 6 showing placement therein of a substance, such as food.
Figure 10:
FIG. 10 is a bottom plan view of the inner vessel member of FIG. 7 showing the inferior vessel portal ridge.

Inner vessel member 40, as is illustrated in FIGS. 1, 2, 3, 6, 7 and 10, is also an open-top bowl-shaped container being sized and shaped for nested placement in outer bowl member 20 and is therefore, preferably fashioned to also have an elliptic horizontal cross-section or approximate an elliptic shape when viewed from a top plan view or bottom plan view as specifically illustrated in FIGS. 6 and 10. Inner vessel member 40 primarily functions to retain or contain a temperature-controlled substance 101 as shown in FIG. 7. Temperature-controlled substance 101, as indicated above, may include foodstuffs, medicinal or medical products, plant products, pet products, and other similar temperature-dependent items. As further noted, inner vessel member is also preferably constructed with porous or breathable ceramic materials and generally comprises an inner vessel surface 42 as illustrated in FIGS. 2, 3, 6 and 7; an outer vessel surface 44 as illustrated in FIGS. 2, 7 and 10; a superior perimeter flange 46 as illustrated in FIGS. 1, 3, 6 and 10; a superior vessel contact seat 48 as illustrated in FIGS. 1, 3, 6 and 7; and an inferior vessel portal ridge 50 as illustrated in FIGS. 2, 7 and 10. Superior perimeter flange 46 is sized and shaped to snug down or snugly rest atop superior bowl support rim 26. The junction between superior perimeter flange 46 and superior bowl support rim 26 is snug or gapless for preventing the passage or permeation of vapor through gaps between the junction point of superior perimeter flange 46 and superior bowl support rim 26. Superior vessel contact seat 48 is spatially-located inwardly adjacent to superior perimeter flange 46 and has a critical contact seat perimeter dimension, which dimension includes an inner seat perimeter 49(a) and an outer seat perimeter 49(b). Inner seat perimeter 49(a) and outer seat perimeter 49(b) thus have a certain seat width measured therebetween, as is illustrated in FIG. 6.

As inner vessel member 40 and outer bowl member 20 nest together in the described fashion, outer vessel surface 44 is sized and shaped to rest in gapped relation to inner bowl surface 22 as shown in FIG. 2, thus creating a container cavity for retaining vapor and the temperature-maintaining matter. Inner vessel surface 42, outer vessel surface 44 and superior perimeter flange 46 are further defined by preferably comprising a hydrophobic, vapor-impervious, glazed coating, preferably of a type that functions to prevent passage or permeation of vapor or water-based solution through the vapor-impervious glazed coating, thus forcing vapor, permeating from the volatile temperature-maintaining matter, through unglazed inferior vessel portal ridge 50, which then may further permeate the structural space sandwiched between inner vessel surface 42 and outer vessel surface 44. Further, the vapor may then exit the structural space between inner vessel surface 42 and outer vessel surface 44 via superior vessel contact seat 48. Inner vessel surface 42, outer vessel surface 44 and superior perimeter flange 46, when provided with a vapor-impervious glazed coating, thus form a porous conduit through which vapor may permeate. Further discussion is outlined below under the section entitled: DISCUSSION OF PREFERRED MATERIALS regarding capillary action of water through the porous media should the user overfill outer bowl member 20 above the proposed line of demarcation on inner bowl surface 22.

As indicated, a significant aspect of the present invention is that inner vessel member 40 is sized and shaped for placement within the interior of outer bowl member 20 in a removable stacking relationship, as is illustrated in FIGS. 1, 2, 3 and 6. In other words, inner vessel member 40 may be stacked inside of outer bowl member 20 and then removed, when needed, for independent usage. In this last regard, superior perimeter flange 46 may further comprise at least one outwardly extending handle 47 for facilitating the removal of inner vessel member 40 from outer bowl member 20 as shown in FIGS. 1, 2, 3, 6, 7 and 10. Preferably, superior perimeter flange 46 has two outwardly extending handles 47 opposite one another for symmetry and for safety reasons. Symmetrical handle structure contributes to a more aesthetically pleasing appearance and in most cases two handles are safer insofar as a user's left and right hand may more easily lift two handles opposite one another. Outwardly extending handles 47 thus provide for easy grasp and removal of inner vessel member 40 from outer bowl member 20.

Figure 4:
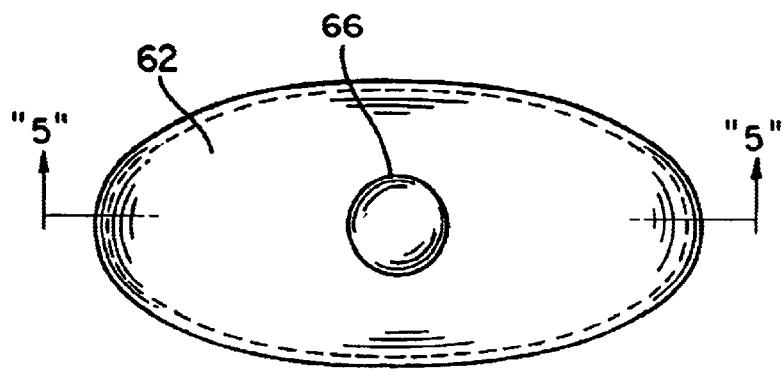
FIG. 4 is a top plan view of the lid member showing the inferior lid contact surface in phantom.
Figure 5:
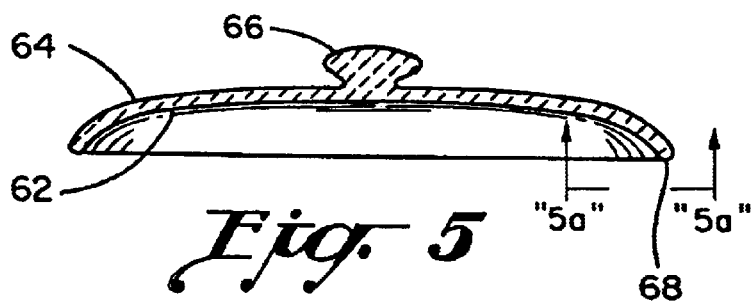
FIG. 5 is a cross-sectional side view of the lid member of FIG. 4.
Figure 5A:
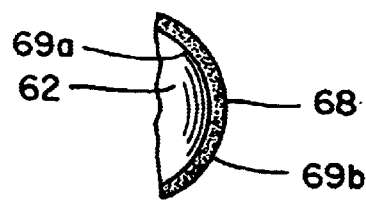
FIG. 5(a) is a fragmentary bottom plan view of the lid member of FIG. 5 showing the inferior lid contact surface.

Lid member 60 is provided being sized and shaped for seatedly enclosing inner vessel member 40 and is further fashioned to have an elliptic horizontal cross-section or approximate an elliptical shape when viewed from a top plan view as specifically illustrated in FIG. 4. Lid member 60 has an inner lid surface 62 as illustrated in FIGS. 5 and 5(*a*); an outer lid surface 64 as illustrated in FIGS. 1, 2, 4 and 5; a superior lifting protrusion 66 as illustrated in FIGS. 1, 2, 4 and 5; and an inferior lid contact surface 68 as illustrated in FIGS. 5 and 5(*a*). Inferior lid contact surface 68 has a lid contact surface perimeter of a critical contact surface perimeter dimension, which dimension includes an inner lid perimeter 69(*a*) and an outer lid perimeter 69(*b*). Inner lid perimeter 69(*a*) and outer lid perimeter 69(*b*) thus have a certain lid contact surface width measured therebetween, as is illustrated in FIG. 5(*a*).

Inferior lid contact surface 68 is sized and shaped to snug down or snugly rest atop superior vessel contact seat 48. The junction between superior vessel contact seat 48 and inferior lid contact surface 68 is snug or gapless for preventing the passage or permeation of vapor through gaps between the junction point of superior vessel contact seat 48 and inferior lid contact surface 68. Further, the measured width between inner lid perimeter 69(*a*) and outer lid perimeter 69(*b*) is less than the measured width between inner seat perimeter 49(*a*) and outer seat perimeter 49(*b*). More precisely, inner lid perimeter 69(*a*) is substantially the same shape and dimension of inner seat perimeter 49(*a*), but outer lid perimeter 69(*b*) has a lesser dimension (though same shape) as outer seat perimeter 49(*b*). Thus the outer edge of inferior lid contact surface 68 terminates at a point intermediate the measured width between inner seat perimeter 49(*a*) and outer seat perimeter 49(*b*), thus exposing a portion of superior contact seat 68 of enclosed inner vessel member 40 to the air or creating a contact seat vent 52 as illustrated in FIG. 1.

Inner lid surface 62, outer lid surface 64 and superior lifting protrusion 66 are each further defined by preferably comprising a hydrophilic, vapor-impervious, glazed coating, preferably of a type that functions to prevent passage or permeation of vapor or water-based solution through the vapor-impervious glazed coating, thus forcing vapor, permeating from the volatile temperature-maintaining matter in the container cavity, through unglazed inferior vessel portal ridge 50, through superior contact seat 48, and either into inferior lid contact surface 68 or into the air adjacent container assembly 10 via contact seat vent 52.

Inner lid surface 62 and outer lid surface 64 preferably define an ellipsoidal upper shell for increasing the internal volume of the enclosed inner vessel member as shown in FIGS. 2 and 5. By thus increasing the internal volume of the enclosed inner vessel member 40, users are enabled to place more voluminous temperature-controlled substances 101 such as food or other substances therein.

As is commonly known, the flow or transfer of heat energy will cease when the temperatures of two adjacent compositions become equal. This is true even if the two compositions are composed of different substances. Heat energy thus flows spontaneously from heated compositions or objects to cooler compositions or objects, but never vice versa. The permeation of vapor through the unglazed portions of container assembly 10 as described thus facilitates the maintenance of temperature in the enclosed inner vessel member 40. By providing components, the interstices of which become saturated with a temperature-maintaining vapor, heat energy transfer from warmer regions to cooler regions is more uniform using the present invention.

First Alternative Embodiment

Figure 11:
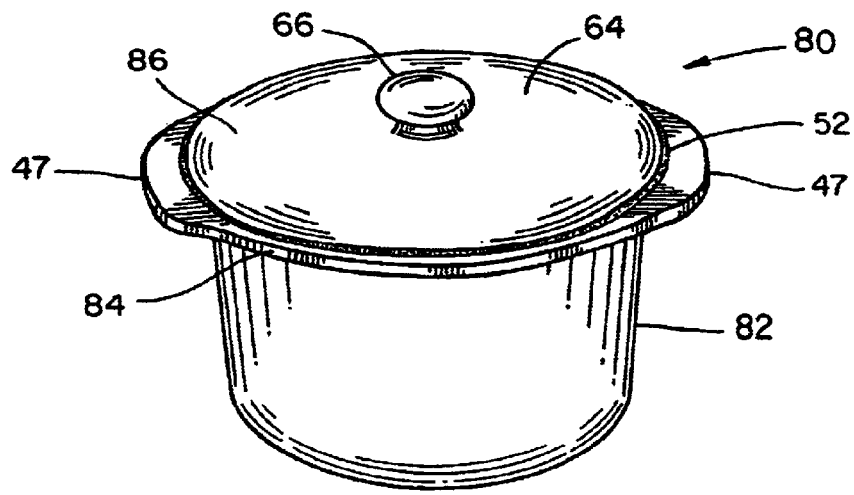
FIG. 11 is a perspective view of an alternative embodiment of the container assembly in an assembled state.

A first alternative embodiment of the present invention concerns a container assembly 80 as perspectively illustrated in FIG. 11. Container assembly 80 is virtually identical to container assembly 10 save for having differently shaped primary components, namely, an outer bowl member 82, an inner vessel member 84 and lid member 86 all of which have a substantially circular, horizontal cross-section or circular shape when viewed from a top plan view. Outer bowl member 82 is thus illustrated in FIG. 16; inner vessel member 84 is thus illustrated in FIG. 14; and lid member 86 is thus illustrated in FIG. 12. Container assembly 80 is designed for placement of more voluminous quantities of temperature-controlled substance into the enclosed inner vessel member 84. In this last regard, it is contemplated that container assembly 80 is designed primarily for the placement of food or other substances, which are to be maintained in a heated ambient temperature. In this regard, container assembly 80 is further described by preferably comprising oven-proofed porous material so as to enable users to place the same in ovens or similar other chambers used for heating.

Figure 16:
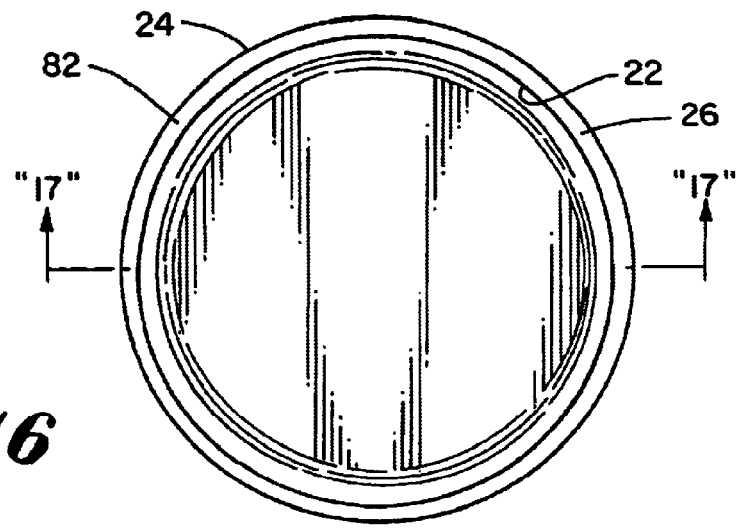
FIG. 16 is a top plan view of an alternative outer bowl member showing the superior bowl support rim.

Outer bowl member 82, as is illustrated in FIGS. 11, 16, 17 and 18, is an open-top bowl-shaped container and is preferably fashioned to have a substantially circular horizontal cross-section or approximate a circular shape when viewed from a top plan view as specifically illustrated in FIG. 16. Outer bowl member 82 functions to retain or contain temperature-maintaining matter, such as heated water-based solutions.

Figure 17:
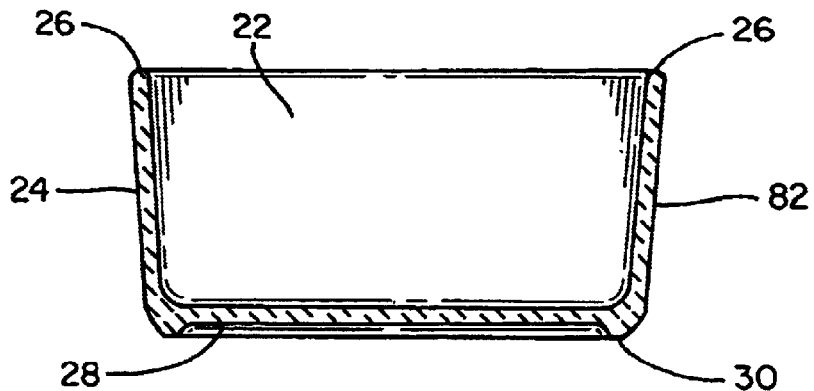
FIG. 17 is a cross-sectional side view of the outer bowl member of FIG. 16.
Figure 18:
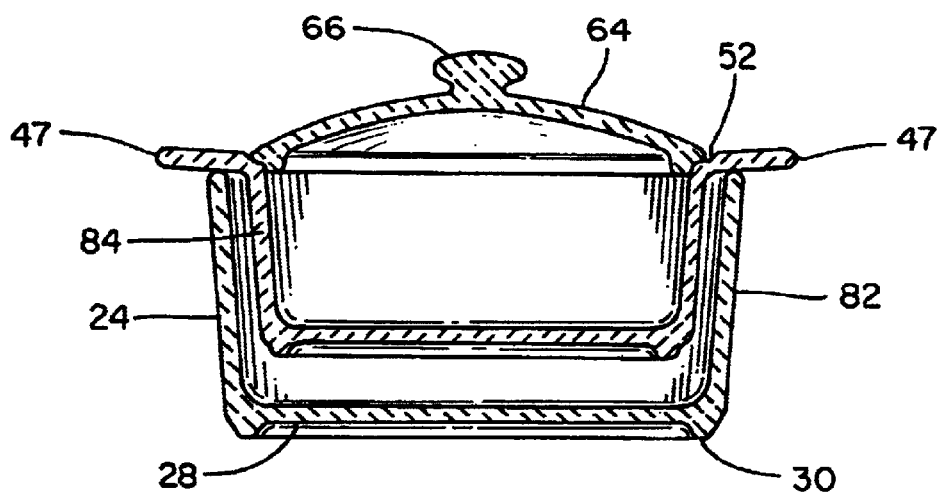
FIG. 18 is a cross-sectional side view of an alternative embodiment of the container assembly in an assembled state.

Outer bowl member 82 further comprises inner bowl surface 22 as illustrated in FIGS. 16 and 17; outer bowl surface 24 as illustrated in FIGS. 16, 17 and 18; superior bowl support rim 26 as illustrated in FIGS. 16 and 17; and inferior bowl contact surface 28 as illustrated in FIGS. 17 and 18. Inner bowl surface 22, outer bowl surface 24 and superior bowl support rim 26 each further preferably comprise a hydrophilic, vapor-impervious, glazed coating vapor-impervious glazed coating, preferably of a type that functions to prevent passage or permeation of vapor or water-based solution through the vapor-impervious glazed coating glazed coating, thus forcing permeating vapor in an upward direction toward the open-top of the bowl-shaped outer bowl member 82. Preferably, inferior bowl contact surface 28 is left unglazed. Left unglazed, inferior bowl contact surface 28 thus increases frictional forces between inferior bowl contact surface 28 and a contact surface upon which container assembly is placed, thus reducing the tendency for outer bowl member 82 to slide along the contact surface. A line of demarcation may also be added to inner bowl surface 22 for aiding users in the placement of temperature-maintaining matter into outer bowl member 82 without overfilling the same.

Further, inferior bowl contact surface 28 may further comprise an inferior bowl perimeter ridge 30 as illustrated in FIGS. 17 and 18. Inferior bowl perimeter ridge 30 thus elevates inferior bowl contact surface 28 from a contact surface so as to prevent temperature-related damage to the contact surface. Inferior bowl contact ridge 30 is also preferably unglazed for increasing frictional forces between inferior bowl contact ridge 30 and a contact surface upon which container assembly 80 is placed, thus reducing the tendency for outer bowl member 82 to slide along the contact surface.

Figure 14:
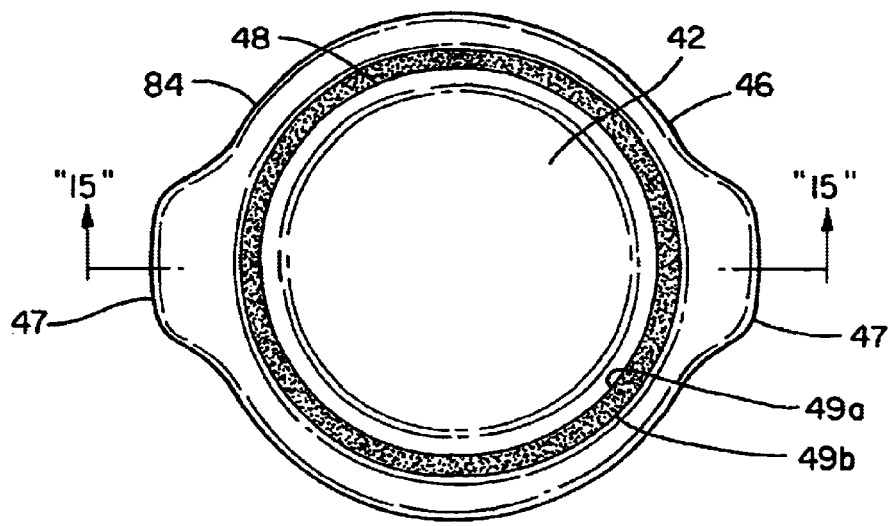
FIG. 14 is a top plan view of an alternative inner vessel member showing the superior vessel contact seat.
Figures 15, 15A:
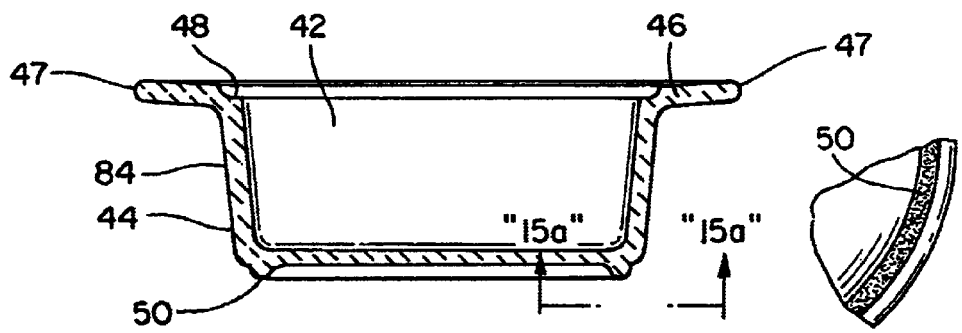
FIG. 15 is a cross-sectional side view of the inner vessel member of FIG. 14.
FIG. 15(a) is a fragmentary bottom plan view of the inner vessel member of FIG. 15 showing the inferior vessel portal ridge.

Inner vessel member 84, as is illustrated in FIGS. 14, 15 and 18, is also an open-top bowl-shaped container being sized and shaped for nested placement in outer bowl member 82 and is therefore, preferably fashioned to also have a substantially circular horizontal cross-section or approximate a circular shape when viewed from a top plan view as specifically illustrated in FIG. 14. Inner vessel member 84 primarily functions to retain or contain a temperature-controlled substance. The temperature-controlled substance, as indicated above, may include foodstuffs, medicinal or medical products, plant products, pet products, and other similar temperature-dependent items.

As further noted, inner vessel member is also preferably constructed with porous or breathable materials and generally comprises inner vessel surface 42 as illustrated in FIGS. 14 and 15; outer vessel surface 44 as illustrated in FIG. 15; superior perimeter flange 46 as illustrated in FIGS. 14 and 15; superior vessel contact seat 48 as illustrated in FIGS. 14 and 15; and inferior vessel portal ridge 50 as illustrated in FIGS. 15 and 15(a). Superior perimeter flange 46 is sized and shaped to snug down or snugly rest atop superior bowl support rim 26. The junction between superior perimeter flange 46 and superior bowl support rim 26 is snug or gapless for preventing the passage or permeation of vapor through gaps between the junction point of superior perimeter flange 46 and superior bowl support rim 26. Superior vessel contact seat 48 is spatially-located inwardly adjacent to superior perimeter flange 46 and has a critical contact seat perimeter dimension, which dimension includes inner seat perimeter 49(a) and outer seat perimeter 49(b). Inner seat perimeter 49(a) and outer seat perimeter 49(b) thus have a certain seat width measured therebetween, as is illustrated in FIG. 14.

As inner vessel member 84 and outer bowl member 82 nest together in the described fashion, outer vessel surface 44 is sized and shaped to rest in gapped relation to inner bowl surface 22 as shown in FIG. 18, thus creating a container cavity for retaining vapor and the temperature-maintaining matter. Inner vessel surface 42, outer vessel surface 44 and superior perimeter flange 46 are further defined by preferably comprising a hydrophilic, vapor-impervious, glazed coating, preferably of a type that functions to prevent passage or permeation of vapor or water-based solution through the vapor-impervious glazed coating, thus forcing vapor, permeating from the volatile temperature-maintaining matter, through unglazed inferior vessel portal ridge 50, which then may further permeate the structural space sandwiched between inner vessel surface 42 and outer vessel surface 44. Further, the vapor may then exit the structural space between inner vessel surface 42 and outer vessel surface 44 via superior vessel contact seat 48. Inner vessel surface 42, outer vessel surface 44 and superior perimeter flange 46, when provided with a vapor-impervious glazed coating, thus form a porous conduit through which vapor may permeate.

As indicated, a significant aspect of the present invention is that inner vessel member 84 is sized and shaped for placement within the interior of outer bowl member 82 in a removable stacking relationship, as is illustrated in FIGS. 11 and 18. In other words, inner vessel member 84 may be stacked inside of outer bowl member 82 and then removed, when needed, for independent usage. In this last regard, superior perimeter flange 46 may further comprise at least one outwardly extending handle 47 for facilitating the removal of inner vessel member 84 from outer bowl member 82. Preferably, superior perimeter flange 46 has two outwardly extending handles 47 opposite one another for symmetry and for safety reasons as shown in FIGS. 11, 14, 15 and 18. Symmetrical handle structure contributes to a more aesthetically pleasing appearance and in most cases two handles are safer insofar as a user's left and right hand may more easily lift two handles opposite one another. Outwardly extending handles 47 thus provide for easy grasp and removal of inner vessel member 84 from outer bowl member 82.

Figure 12:
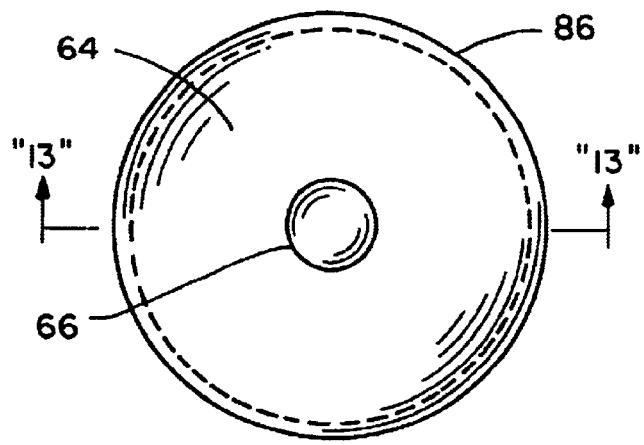
FIG. 12 is a top plan view of an alternative lid member showing the inferior lid contact surface in phantom.
Figure 13:
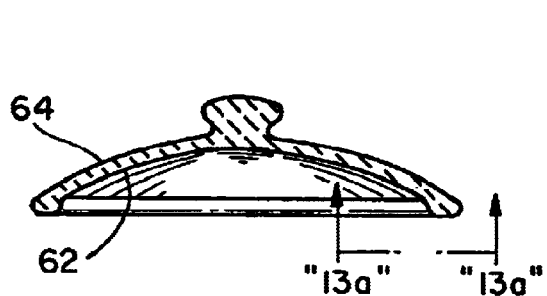
FIG. 13 is a cross-sectional side view of the lid member of FIG. 12.
Figure 13A:
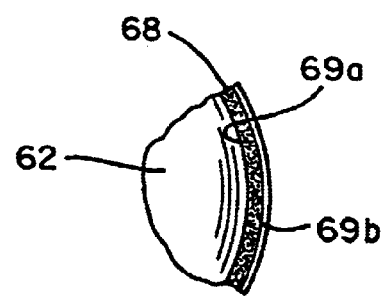
FIG. 13(a) is a fragmentary bottom plan view of the lid member of FIG. 13 showing the inferior lid contact surface.

Lid member 86 is provided being sized and shaped for seatedly enclosing inner vessel member 84 and is further fashioned to have a substantially circular horizontal cross-section or approximate a circular shape when viewed from a top plan view as specifically illustrated in FIG. 12. Lid member 86 has inner lid surface 62 as illustrated in FIGS. 13 and 13(a); outer lid surface 64 as illustrate 11, 12, 13 and 18; superior lifting protrusion 66 as illustrated in FIGS. 11, 12 and 18; and inferior lid contact surface 68 as illustrated in FIG. 13(a). Inferior lid contact surface 68 has a lid contact surface perimeter of a critical contact surface perimeter dimension, which dimension includes inner lid perimeter 69(a) and outer lid perimeter 69(b). Inner lid perimeter 69(a) and outer lid perimeter 69(b) thus have a certain lid contact surface width measured therebetween, as is illustrated in FIG. 13(a).

Inferior lid contact surface 68 is sized and shaped to snug down or snugly rest atop superior vessel contact seat 48. The junction between superior vessel contact seat 48 and inferior lid contact surface 68 is snug or gapless for preventing the passage or permeation of vapor through gaps between the junction point of superior vessel contact seat 48 and inferior lid contact surface 68. Further, the measured width between inner lid perimeter 69(a) and outer lid perimeter 69(b) is less than the measured width between inner seat perimeter 49(a) and outer seat perimeter 49(b). More precisely, inner lid perimeter 69(a) is substantially the same shape and dimension of inner seat perimeter 49(a), but outer lid perimeter 69(b) has a lesser dimension (though same shape) as outer seat perimeter 49(b). Thus the outer edge of inferior contact surface 68 terminates at a point intermediate the measured width between inner seat perimeter 49(a) and outer seat perimeter 49(b), thus exposing superior contact seat 68 of enclosed inner vessel member 40 to the air or creating a contact seat vent 52 as illustrated in FIGS. 11 and 18.

Inner lid surface 62, outer lid surface 64 and superior lifting protrusion 66 are each further defined by preferably comprising a hydrophilic, vapor-impervious, glazed coating, preferably of a type that functions to prevent passage or permeation of vapor or water-based solution through the vapor-impervious glazed coating, thus forcing vapor, permeating from the volatile temperature-maintaining matter in the container cavity, through unglazed inferior vessel portal ridge 50, through superior contact seat 48, and either into inferior lid contact surface 68 or into the air adjacent container assembly 10 via contact seat vent 52.

Inner lid surface 62 and outer lid surface 64 preferably define an ellipsoidal upper shell for increasing the internal volume of the enclosed inner vessel member as shown in FIGS. 13 and 18. By thus increasing the internal volume of the enclosed inner vessel member 84, users are enabled to place more voluminous temperature-controlled foodstuff or other substances therein.

Second Alternative Embodiment

Figure 19:
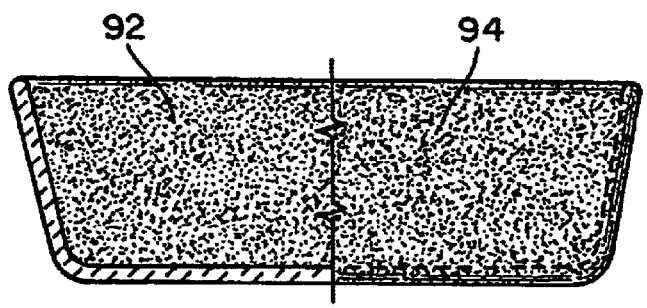
FIG. 19 is a side plan view of an alternative outer bowl member with parts broken away showing the inner bowl surface and outer bowl surface in an unglazed state.

A second alternative embodiment of the present invention concerns a container assembly similar to container assemblies 10 and 80 save for the amount of glazing applied to inner bowl surface 22 and outer bowl surface 24. In the second alternative embodiment, an inner bowl surface 92 and an outer bowl surface 94 are left unglazed as is shown in FIG. 19. By leaving inner bowl surface 92 and outer bowl surface unglazed in varying extents (not illustrated) the manufacturer can tailor the container assemblage to cultural or situational norms. For example, a culture that is not heavily dependent upon refrigeration for its preservation needs, may desire a container assemblage with more breathability or porosity to increase the efficiency of the cooling/heating function of the container assemblage while downplaying the need for an aesthetically pleasing container assemblage, as is embodied in a somewhat thoroughly glazed assembly. It is thus contemplated that different consumers will desire different degrees of surface glazing, which the second alternative embodiment accommodates.

Method for Maintaining Container Contents in a Desired Temperature

The method of maintaining a temperature-controlled substance in a desired ambient temperature comprises the steps of (1) providing outer bowl member 20 or 82 as described herein; (2) placing temperature-maintaining matter as described herein (such as ice-water solution 100) into outer bowl member 20 or 82; (3) providing inner vessel member 40 or 84 either with inner bowl surface 22 or 92 and outer bowl surface 24 or 94 as described herein; (4) placing a temperature-controlled substance into inner vessel member 40 or 84; (5) nesting inner vessel member 40 or 84 with placed temperature-controlled substance into outer bowl member 20 or 82; (6) providing lid member 60 or 86 as described herein; and (7) enclosing inner vessel member 40 or 84 with lid member 60 or 86 for maintaining the temperature-controlled substance in the desired ambient temperature. Naturally outer bowl member 20, inner bowl member 40 and lid member 60 are used in tandem with one another while outer bowl member 82, inner bowl member 84 and lid member 86 are used in tandem with one another.

Discussion of Preferred Materials

Ceramics art is ancient and has been used in many types of products ranging from simple utilitarian products to mass storage containers for wines and grains to highly sought-after ornamental treasures like service sets from Roman, Chinese and English artisans. Typically, ceramics are regarded as dense, hard, extremely strong, functional shapes that fit the given need of the user. Of the various types of ceramic, including generic ceramics found in everything from cabinet pull knobs and electric wire insulators to optical glass fibers, fine china and keepsakes such as dolls and figurines, the preferred materials for the present invention comprise ceramics that have been developed for their porous natures. These types of ceramic are typically referred to as hydrophilic or "water loving" and will provide capillary wicking and transport of water-based solutions in the event the ceramic contact surface comes into physical contact with a water-based solution reservoir. A porous ceramic is akin to many natural substances such as plants, soils, rocks, bricks and bone. Such natural materials have interstitial crevices and pathways (pores) that allow liquids and gases to mix, migrate and flow. It is this unique porous structure of the material that makes it the preferred material for the construction of the present invention.

Early porous ceramics were developed from high temperature porcelain "bisqueware," which is more commonly known as "fired" but unglazed ceramic used in fine china. Other common compositions called for lower firing temperatures associated with talc/clay mixtures to produce a similar porous structure. Modern day porous ceramics are usually fabricated from either porcelain or Alumina bodies. Preferably, the porous ceramic utilized in the present invention should be engineered as an "open cell/pathway" ceramic, which means that the pores and pathways are interconnected and interlinked to provide a complete flow pathway throughout the material for permeating or migrating vapors or water-based solution.

Unlike porous materials developed from plastics that are hydrophobic (water hating), ceramics are naturally wettable and hydrophilic. The tough durable nature of a fired porous ceramic further makes it the preferential material of choice. Unlike porous metals that may oxidize or leak, porous ceramics are generally inert and can be produced with very consistent and uniform pore structures. Further, structures and devices fabricated from thick-walled porous ceramics tend to be more durable and therefore can withstand punishment from ordinary wear and tear associated with serving dish-ware and thus porous ceramics are the preferred material.

As indicated, the preferable porous ceramic material chosen to construct the present invention should comprise hydrophilic or water accepting materials. The term "hydrophilic" refers to those materials, such as porous ceramics and metals that have a natural ability to fill pores by capillary action. This means the pores and channels of the preferred porous ceramic will have a highly charged pore surface that will attract and bond the polar molecules of water vapor or other polar vapors of temperature-maintaining matter used.

Further, the pore size of a porous ceramic is of critical importance because it directly affects the ceramic's air entry value or "bubbling pressure" and hydraulic conductivity. The air entry value is the pressure at which air will break through a wetted pore channel. The hydraulic (liquid) conductivity of a porous ceramic is a measure of the rate at which a ceramic material of known thickness may conduct liquid from one surface to an opposing surface under a known pressure. The hydraulic conductivity will vary with the type of pore fluid used (generally water). The effective pore size is determined by the minimum orifice within a channel or pore. These properties that are determined by pore size are intrinsic to ceramics and to all other porous materials. How a porous material behaves in any application is directly related to these pore properties and the material from which it is made. As the type of porous ceramic may differ depending on the specific application, it is recommended that the user consult a reputable porous ceramics manufacturer regarding the specifications of the proper porous ceramic for a given application.

It is further noted that most porous materials will change their volume with changes in moisture content. Because physical changes are brought about by changes in moisture content that may cause deterioration of a material and shorten its useful life, the tough durable nature of a fired porous ceramic further makes it the preferential material of choice. Further noted is that the temperature-maintaining characteristics of the present invention will differ depending on the amount of ice-water solution 100 the user places into outer bowl members 20 or 82. If the user places sufficient amount of ice-water solution 100 into outer bowl member 20 or 82 such that inferior vessel contact ridge 50 comes into contact with the water-based solution, then adsorption of ice-water solution 100 will occur.

As long as water in its three states (solid, liquid, gaseous) is in the environment outside a material, it can be referred to as bulk water and its behavior is predictable on the basis of the normal properties of water. When it comes into contact with the surface of a material (for example when contacting unglazed inferior vessel portal ridge 50), however, its behavior is no longer predictable on the basis of its bulk properties.

By way of illustration, by placing a drop of water on the surface of a porous brick, the water not only spreads on the surface but also enters the material, disappearing into the pores and leaving only a damp spot at the surface. If the same brick had been pre-treated with a hydrophobic glazed coating, the drop would remain on the surface. The different behavior of water in the two environments demonstrates the mutual influence exerted by the water and the surface of the material.

The first layer of atoms at any surface is at an energy state different from that of the underlying atoms within the material owing to an imbalance of forces. This results in what is described as interfacial energy or surface energy. In liquids it is called surface tension. The surface energy, as would be expected, varies with the nature of the surface as defined by the particular atoms at the surface and their interactions with neighboring atoms. Surfaces that are wetted by water often have an attraction for water molecules. This results in a process of adsorption whereby a definite amount of water will be held at equilibrium with the relative humidity of the environment. Where the material has a very low surface area (non-porous material) the total amount of water held by the material will be insignificant. Where the material is porous, however, and the total surface area is large, the amount of water held will be relatively large.

Should inferior vessel portal ridge 50 come in contact with ice-water solution 100, the wetting process that follows involves capillary conduction, where suction acts as the driving force, and is quite different from water vapor diffusion. The process of wetting by liquid water involves water proceeding as a front involving a very steep gradient of moisture content. The advance of this front into the porous material is characteristic of the material (each material having its rate constant) and decreases with the square of the distance traveled. It will take approximately four times as long to pass through a sample 2 inches thick as it will a sample 1 inch thick, both of identical material. When the wetting front passes through the material, thus saturating it, the flow ceases unless a head or pressure difference is applied on the source of water. The flow that follows through the saturated material involves a different process, being controlled by the permeability and the hydraulic pressure difference. Wetting by contact with liquid water (as would be the case in situations where the user overfills outer bowl member 20 or 82 with temperature-maintaining matter above the line of demarcation) would produce a very large moisture content gradient, in contrast with wetting by vapor unless the latter also involves a temperature gradient.

Discussion of Testing Data

In an effort to obtain initial stability data for butter samples stored in the present invention, Medallion Labs of Minneapolis Minnesota tested the present invention in the following manner: Butter samples were stored at room temperature (approximately 70 Fahrenheit) in the present invention or container assembly. Each container assembly was filled with cold tap water to the fill line as marked on the inner bowl surface. Butter samples were pulled for analyses at 0, 4, 8, 11, 15, 18 and 21 days of storage. Aerobic plate counts were run to check for microbial growth; peroxide values were run as a marker of oxidative rancidity; and free fatty acids were run as a marker of hydrolytic rancidity.

No spikes in any of the analytical markers were evidenced during the testing process. No quantifiable microbial growth was detected in the butter samples tested in this study over the 21 day period. The increase in the peroxide value after four days of storage may have resulted from the photoinitiation of oxidative rancidity on the surface of the butter. This would be associated with the butter samples being exposed to light. The results from the described testing are summarized in Table No. 1, as found below.

TABLE NO.1

| Days of Storage | Free Fatty Acids (g/100 g fat) | Peroxide Value (Meq/kg) | Aerobic Plate Count | Mesophilic Anaerobic Spores | Mesophilic Aerobic Spores |
|---|---|---|---|---|---|
| 0 | 0.276 | 0.227 | | <10 | <10 |
| 4 | 0.217 | 0.359 | <10 | <10 | <10 |
| 8 | 0.213 | 0.343 | <100 | | |
| 11 | 0.244 | 0.366 | <10 | | |
| 15 | 0.177 | 0.383 | <100 | | |
| 18 | 0.158 | 0.365 | <100 | | |
| 21 | 0.164 | 0.410 | <100 | | |

While the above description contains much specificity, this specificity should not be construed as limitations on the scope of the invention, but rather as an exemplification of the invention. For example, the porous ceramic material need not be hydrophilic. So long as the container assembly comprises hydrophobic porous ceramic material and allows permeation of vapor from the temperature maintaining matter (similarly of a hydrophobic nature) or wicking action of the same, the porous ceramic material successfully fulfills its vapor (or liquid) conduit purpose. In this regard, should a hydrophobic porous material be used, the temperature-maintaining matter should accordingly have hydrophobic properties and the vapor-impervious glazed coating, while preferably hydrophobic, should be hydrophilic in cases where the user prefers to utilize hydrophobic temperature maintaining matter and hydrophobic porous ceramic.

Furthermore, the container assembly need not be in a lidded state for maintaining temperature-controlled substances at a desired temperature. For example, when users wish to gain entrance to the inner vessel member for utilizing or consuming the temperature-controlled substance, the lid must be removed, thus exposing the temperature-controlled substance to the air adjacent the container assembly. The container assembly, however, continues to be operable insofar as the temperature-maintaining matter and the described permeating vapor continue to maintain the temperature-controlled substance at a desired temperature without the lid member in place atop the inner vessel member. In this regard, it is contemplated that the present invention may be easily adapted for continual serving purposes, where the lid member is removed for prolonged periods of time or left off entirely. In this regard, the present invention may readily be adapted for other uses. For example, the present invention may foreseeably be constructed of terra cotta or terra cotta-type material and utilized as a pet watering bowl.

Accordingly, although the invention has been described by reference to a preferred embodiment, it is not intended that the novel device be limited thereby, but that modifications thereof are intended to be included as falling within the broad scope and spirit of the foregoing disclosure, the following claims and the appended drawings.

I claim:

1. A food container assembly for maintaining food items in a desired ambient temperature, the food container assembly comprising:

an outer bowl member, the outer bowl member constructed with porous material, the outer bowl member for containing temperature-maintaining matter, the temperature-maintaining matter having volatility, the volatility allowing vapor to permeate from the temperature-maintaining matter, the outer bowl member having an inner bowl surface, an outer bowl surface, a superior bowl support rim, and an inferior bowl contact surface, the inner bowl surface, the outer bowl surface and the superior bowl support rim each further comprising vapor-impervious glazed coating to prevent passage of vapor through the vapor-impervious glazed coating;

an inner vessel member, the inner vessel member constructed with porous material, the inner vessel member for containing temperature-controlled food, the inner vessel member having an inner vessel surface, an outer vessel surface, a superior perimeter flange, a superior vessel contact seat and an inferior vessel portal ridge, the superior perimeter flange being sized and shaped to snug down atop the superior bowl support rim for preventing the passage of vapor between the superior perimeter flange and the superior bowl support rim, the superior vessel contact seat being spatially-located inwardly adjacent to the superior perimeter flange, the superior vessel contact seat having a contact seat perimeter, the outer vessel surface being sized and shaped to rest in gapped relation to the inner bowl surface thus creating a container cavity for retaining vapor, the inner vessel surface, the outer vessel surface and the superior perimeter flange each farther comprising vapor-impervious glued coating to prevent passage of vapor through the vapor-impervious glazed coating; and a lid member, the lid member constructed with porous material, the lid member for enclosing the inner vessel member, the lid member having an inner lid surface, an outer lid surface, a superior lifting protrusion, and an inferior lid contact surface, the inferior lid contact surface having a lid contact surface perimeter, the inferior lid contact surface being sized and shaped to snug down atop the superior vessel contact seat for preventing the passage of vapor between outer lid surface and the superior lifting protrusion each further comprising vapor-impervious glazed coating to prevent the passage of vapor through the vapor-impervious glazed coating, thus allowing vapor to permeate from the container cavity through the inferior vessel portal ridge between the inner vessel surface and outer vessel surface, thus further allowing vapor to permeate through the superior vessel contact seat and inferior lid contact surface, the permeation of vapor thus facilitating the maintenance of temperature in the enclosed inner vessel member, the inferior lid contact surface perimeter having a measured dimension less than the measured dimension of the contact seat perimeter thus exposing a contact seat vent, the contact seat vent for allowing vapor to permeate to the air adjacent the enclosed inner vessel member for further facilitating the maintenance of temperature in the enclosed inner vessel member.

2. The food container assembly of claim 1 wherein the inner lid surface and outer lid surface define an ellipsoidal upper shell, the ellipsoidal upper shell for increasing the internal volume of the enclosed inner vessel member, the increased internal volume of the enclosed inner vessel member thus allowing a user to place voluminous temperature-controlled food therein.

3. The food container assembly of claim 1 wherein in the temperature-maintaining matter is further defined by comprising a water-based solution.

4. The food container assembly of claim 2 wherein the superior perimeter flange further comprises at least one outwardly extending handle for facilitating the removal of the inner vessel member from the outer bowl member.

5. The food container assembly of claim 4 wherein in the inferior bowl contact surface is unglazed, the unglazed inferior bowl contact surface for increasing frictional forces between the inferior bowl contact surface and a contact surface, the unglazed inferior bowl contact surface thus reducing the tendency for the outer bowl member to slide along the contact surface.

6. The food container assembly of claim 5 wherein the outer bowl member, the inner vessel member and the lid member are each shaped so as to have a substantially circular horizontal cross section.

7. The food container assembly of claim 6 wherein the outer bowl member, the inner vessel member and the lid member are each constructed with porous, oven-proofed materials.

8. The food container assembly of claim 7 wherein the inferior bowl contact surface is further defined by comprising an inferior bowl contact ridge, the inferior bowl contact ridge for elevating the inferior bowl contact surface from a contact surface.

9. A container assembly for maintaining container contents in a desired ambient temperature, the container assembly comprising:

an outer bowl member, the outer bowl member for containing temperature-maintaining matter, the temperature-maintaining matter having volatility, the volatility allowing vapor to permeate from the temperature-maintaining matter, the outer bowl member having an inner bowl surface, an outer bowl surface, a superior bowl support rim, and an inferior bowl contact surface;

an inner vessel member, the inner vessel member for containing a temperature-controlled substance, the inner vessel member having an inner vessel surface, an outer vessel surface, a superior perimeter flange sized and shaped to snug down atop the superior bowl support rim, a superior vessel contact seat inwardly adjacent to the superior perimeter flange, and an inferior vessel portal surface, the superior vessel contact seat having a contact seat perimeter, the outer vessel surface being sized and shaped to rest in gapped relation to the inner bowl surface thus creating a container cavity for retaining vapor; and a lid member for enclosing the inner vessel member, the lid member having an inner lid surface, an outer lid surface, a superior lifting protrusion, and an inferior lid contact surface, the inferior lid contact surface having a lid contact surface perimeter, the inferior lid contact surface being sized and shaped to snug down atop the superior vessel contact seat for preventing the passage of vapor between the inferior contact surface and the superior contact seat, the outer bowl member, inner vessel member and lid members being constructed of porous material, the inner lid surface and outer lid surface defining an ellipsoidal upper shell, the ellipsoidal upper shell for increasing the internal volume of the enclosed inner vessel member, the increased internal volume of the enclosed inner vessel member thus allowing a user to place voluminous temperature-controlled substance therein; the inner bowl surface, the outer bowl surface, the superior bowl support rim, the inner vessel surface, the outer vessel surface, the superior perimeter flange, the inner lid surface, the outer lid surface and the superior lifting protrusion comprising vapor-impervious glazed coating to prevent passage of vapor through the vapor-impervious glazed coating, thus allowing vapor to permeate from the container cavity through the inferior vessel portal surface between the inner vessel surface and outer vessel surface, thus further allowing vapor to permeate through the superior vessel contact seat and inferior lid contact surface, the permeation of vapor thus facilitating the maintenance of temperature in the enclosed inner vessel member, the inferior lid contact surface perimeter having a measured dimension less than the measured dimension of the contact seat perimeter thus exposing a contact seat vent, the contact seat vent for allowing vapor to permeate to the air adjacent the enclosed inner vessel member for further facilitating the maintenance of temperature in the enclosed inner vessel member.

10. The container assembly of claim 9 wherein in the temperature-maintaining matter is further defined by comprising a water-based solution.

11. The container assembly of claim 10 wherein the superior perimeter flange further comprises at least one outwardly extending handle for facilitating the removal of the inner vessel member from the outer bowl member.

12. The container assembly of claim 11 wherein the outer bowl member, the inner vessel member and the lid member are each constructed with oven-proofed materials.

* * * * *